Patented May 9, 1939

2,157,137

UNITED STATES PATENT OFFICE 2,157,137

XYLOSEEN- 1,2 -TRIBENZOATES AND PROCESS FOR PRODUCING THE SAME

Randolph T. Major, Plainfield, N. J., and Elmer W. Cook, New York, N. Y., assignors to Merck & Co. Inc., Rahway, N. J., a corporation of New Jersey No Drawing. Application December 24, 1936, Serial No. 117,668

11 Claims. (Cl. 260—234)

This invention relates to new compounds, d- and laevoxyloseen-(1,2) tribenzoate, and to processes for their production.

These compounds were prepared during the course of our investigations of certain new processes for the synthesis of ascorbic acid, and are of interest in that connection.

According to our invention, these isomers are produced by a series of interrelated steps from the corresponding d- and laevoxyloses.

The methods of practicing these steps, for the production of the respective compounds, will be apparent from the following detailed examples.

D-XYLOSE-(1,2)-TRIBENZOATE

*d-Xylose-tetrabenzoate.*—About 50 gms. of d-xylose are added gradually to a mixture consisting of about 190 cc. of benzoyl chloride, 200 cc. of anhydrous pyridine, and 380 cc. of anhydrous chloroform, cooled in an ice bath. The xylose dissolves and the solution is permitted to stand for about 24 hours. About 600 cc. of chloroform is then added, and the solution washed successively with cold dilute sulphuric acid, sodium bicarbonate, and water. After drying over calcium chloride, the chloroform is removed by evaporation in vacuo. The crystalline residue of α-d-xylose tetrabenzoate is recrystallized from dioxane, with the addition of methanol. It is also recrystallized either from absolute alcohol containing 10% pyridine or from benzene with the addition of petroleum ether. The product is quite insoluble in water or petroleum ether and only slightly soluble in warm methanol. It is soluble in chloroform, dioxane, and benzene; has a melting point of about 115–116°, and $$[\alpha]_D^{20} = +115°$$

(dry chloroform; $c=2$).

*Benzo-bromo-d-xylose.*—About 25 gms. of α-d-xylose tetrabenzoate is dissolved in a mixture of anhydrous dioxane and chloroform. A saturated solution of hydrogen bromide in glacial acetic acid (50 cc.) is added and the mixture allowed to stand for 24 hours. Benzobromo-d-xylose precipitates. The mixture is cooled, filtered, and washed with petroleum ether. The product is recrystallized from benzene by the addition of petroleum ether. It has a melting point of 134–135° and $$[\alpha]_D^{20} = +117°$$

(dry chloroform; $c=2$). It is soluble in dioxane, chloroform, acetone, and fairly soluble in methanol. It is insoluble in water, and only slightly soluble in petroleum ether.

*d-Xyloseen-(1,2)-tribenzoate.*—About 20 gms. of benzobromo-d-xylose and 8.7 cc. of anhydrous diethylamine are dissolved in anhydrous benzene in an air-tight container. The solution is heated at 55° for 3 hours, after which about 75% of the theoretical amount of diethylamine hydrobromide has precipitated. After cooling, 150 cc. of benzene are added, and the mixture filtered. The filtrate is washed with iced dilute sulfuric acid and twice with ice water. The benzene extract is dried over calcium chloride and evaporated in vacuo to a gum. The gum is dissolved in 50 cc. of warm absolute alcohol and petroleum ether added to slight turbidity. Upon allowing this to stand for 2 to 3 days in an ice box, d-xyloseen-(1,2)-tribenzoate precipitate. It is recrystallized from absolute alcohol. It has a melting point of about 126–128° C., and $$[\alpha]_D^{20} = -280° C.$$

dry chloroform, $c=0.5$.

LAEVOXYLOSEEN-(1,2)-TRIBENZOATE

α-laevoxylose tetrabenzoate is produced from 1-xylose in a manner similar to the manner of producing d-xylose tetrabenzoate. It has a melting point of 115–116°, and $$[\alpha]_D^{20} = -115°$$

(dry chloroform; $c=2$). When crystallizing the reaction product from absolute alcohol containing 10% pyridine, the β-isomer is obtained. This β-isomer has a melting point of about 173–174°, and $$[\alpha]_D^{20} = +44.5°$$

*Benzobromo-laevoxylose.*—Both α-1-xylose tetrabenzoate (melting point 115–116° C. and β-laevoxylose tetrabenzoate (melting point 173–174° C.) when treated in a manner similar to the method of treating benzobromo-d-xylose, give the same benzobromo-1-xylose. This has a melting point of about 134–135° C. and $$[\alpha]_D^{20} = -116°$$

(dry chloroform; $c=2$).

*Laevoxyloseen-(1,2)-tribenzoate* is prepared by a similar method to that of producing d-xyloseen-(1,2)-tribenzoate. It has the same melting point as that compound and optical rotation, $$[(\alpha)_D^{20} = +280°, \text{dry chloroform}; c=2.]$$

We have also produced xyloseen-(1,2)-tribenzoate dichloride according to the following process:

*Laevoxyloseen-(1,2)-tribenzoate dichloride.*—About 2.5 gms. of laevoxyloseen-(1,2)-tribenzoate are dissolved in about 200 cc. of anhydrous benzene. Chlorine is added until the mixture is permanently colored greenish-yellow. The solution is evaporated in vacuo, and the gummy residue crystallized from absolute alcohol. Laevoxyloseen-(1,2)-tribenzoate dichloride is recrystallized from anhydrous benzene with the addition of petroleum ether.

In addition we have also prepared d-xylose tribenzoate as follows:

About 20 gms. of benzobromo-d-xylose is dissolved in 50 cc. of acetone and 0.8 cc. of water is added. The solution is cooled in an ice-bath and 12 gms. of silver carbonate are added. After stirring for a brief period, effervescence stops. The mixture is then shaken for an hour at room temperature. The insoluble silver salts are filtered and the filtrate evaporated in vacuo until a crystalline residue remains. The product is recrystallized from anhydrous benzene. It has a melting point of 188–189° C. and $$[\alpha]_D^{20} = +39.5°$$

(dry chloroform; $c=2$).

We claim as our invention:

1. Optical isomers of xyloseen-(1,2)-tribenzoate.
2. Racemic xyloseen-(1,2)-tribenzoate.
3. Laevo-xyloseen-(1,2)-tribenzoate.
4. Laevo-xyloseen-(1,2)-tribenzoate dichloride.
5. d-Xylose tribenzoate.
6. The process for the production of dextro and laevo-xyloseen-(1,2)-tribenzoates from the corresponding xylose which comprises treating the xylose with a benzoylating agent such as benzoyl chloride to produce the corresponding dextro and laevo tetrabenzoates, converting the latter to the corresponding benzobromo-xyloses by treatment with hydrogen bromide and finally converting the last named to the respective dextro and laevo xyloseen-(1,2)-tribenzoates, by treatment with anhydrous diethylamine in anhydrous benzene.
7. The process for producing dextro and laevo xyloseen tribenzoates from the corresponding dextro and laevo xyloses which comprises converting the latter to their corresponding xylose tetrabenzoates by reacting upon them with a mixture of benzoyl-chloride, anhydrous pyridine, and anhydrous chloroform; converting the tetrabenzoates thus obtained to their corresponding benzobromo-xyloses by treatment with hydrogen bromide in glacial acetic acid solution; and converting the benzobromo-xyloses thus obtained to the corresponding xyloseen-(1,2)-tribenzoates by treatment with anhydrous diethylamine in anhydrous benzene.
8. A process for the production of xyloseen-(1,2)-tribenzoate-dichloride which comprises treating laevo-xyloseen-(1,2)-tribenzoate with chlorine.
9. A process for the production of d-xylose tribenzoate which comprises hydrolyzing benzobromo-d-xylose, in the presence of a carbonate which will not result in a soluble bromide.
10. A process for the production of d-xylose tribenzoate which comprises hydrolyzing tetrabenzoyl-bromo-d-xylose, in the presence of silver carbonate.
11. A xyloseen-(1,2)-tribenzoate.

RANDOLPH T. MAJOR.
ELMER W. COOK.